United States Patent Office 3,250,797
Patented May 10, 1966

3,250,797
2,3-DIBROMOPROPYL BORATE COMPOUNDS
William G. Woods, Fullerton, Dominick Laruccia, Orange, and Irving S. Bengelsdorf, Tustin, Calif., assignors to United States Borax & Chemical Corporation, Los Angeles, Calif., a corporation of Nevada
No Drawing. Original application Nov. 29, 1962, Ser. No. 241,045, now Patent No. 3,189,565, dated June 15, 1965. Divided and this application Aug. 27, 1964, Ser. No. 392,644
2 Claims. (Cl. 260—462)

This application is a division of our copending application Serial No. 241,045 filed November 29, 1962 now U.S. Patent 3,189,565.

This invention relates to new 2,3-dibromopropyl borate compounds and novel polyurethane compositions containing 2,3-dibromopropyl borate compounds as fire-retardants therefor.

The polyurethanes, formed by the reaction of a polyisocyanate with an organic compound having at least two groups containing reactive hydrogens, have become an increasingly useful group of plastics. For example, they find many applications as rigid and flexible foams, as adhesives, coatings, elastomers, potting resins, in textiles and many other applications. However, a major obstacle to the further expansion of the uses of polyurethanes, especially as foams, is their lack of fire retardancy. This property is especially important in the construction industry, where foams are used as insulation, sandwich panels, and structural panels. Thus, there is a real need in the art for flame-resistant polyurethane compositions.

It is, therefore, an object of this invention to provide noval flame-resistant polyurethane compositions.

It is also an object of this invention to provide methods of making flame-resistant polyurethane compositions.

It is a further object of this invention to provide novel 2,3-dibromopropyl borate compounds.

Other objects will become apparent from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

The present invention provides polyurethane compositions containing a 2,3-dibromopropyl borate compound in amount sufficient to retard the flammability of said composition. The invention also provides, as new compositions, the compounds bis(2,3-dibromopropyl)-2,6-di-tert.-butylphenyl borate and 2-(2,3-dibromopropoxy)-4,4,6-trimethyl-1,3-dioxa-2-borinane.

The 2,3-dibromopropyl borate compounds useful in this invention as flame retardants can be represented by the formula

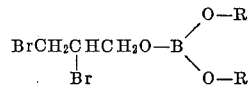

in which the R groups bonded to the oxygen atoms can be one or two additional 2,3-dibromopropyl groups and/or other organic radicals. Additionally the valences of these two oxygen atoms can be satisfied by a divalent alkylene radical. Thus, any organic radical which does not interfere with the polymer-forming reaction of the polyurethanes can be attached to the oxygen atoms as long as at least one 2,3-dibromopropoxy group is present. We prefer that R represent the 2,3-dibromopropyl group, a monocyclic aryl radical such as phenyl, and especially the 2,6-disubstituted phenyls such as 2,6-di-tert.-alkylphenyls, or as noted above, the two R's combined can represent a divalent organic radical such as ethylene, propylene, and their alkyl substituted derivatives. Preferably, the alkylene radicals are substituted with one or more lower alkyl groups to provide an alkylene radical of two or three carbon atoms in length and having a total of about 3 to 20 carbon atoms.

Examples of suitable 2,3-dibromopropyl borate compounds include:

Tris(2,3-dibromopropyl)borate
Bis(2,3-dibromopropyl)-2,6-di-tert.-butylphenyl borate
2-(2,3-dibromopropoxy)-5-methyl-5-n-propyl-1,3-dioxa-2-borinane
2-(2,3-dibromopropoxy)-1,3-dioxa-2-borolane
Bis(2,3-dibromopropyl)-2,6-di-tert.butyl-4-methylphenyl borate
2-(2,3-dibromopropoxy)-4,4,6-trimethyl-1,3-dioxa-2-borinane
2-(2,3-dibromopropoxy)-4-methyl-1,3-dioxa-2-borinane
2-(2,3-dibromopropoxy)-4,4,5,5-tetramethyl-1,3-dioxa-2-borolane
Bis(2,3-dibromopropyl)-2,4,6-tri-tert.-amylphenyl borate The presently preferred borate is tris(2,3-dibromopropyl)borate.

The 2,3-dibromopropyl borates can be prepared by bromination of the corresponding allyl borate, as illustrated by the following examples.

EXAMPLE I

*Tris(2,3-Dibromopropyl)borate*

To a stirred solution of 91.0 grams (0.5 mole) of freshly distilled triallyl borate in 250 ml. of carbon tetrachloride cooled by an ice bath was slowly added (over a 1.2 hour period) 250 grams (1.56 mole) of bromine at such a rate that the temperature remained below 18° C. The resultant red solution was stirred an additional hour at room temperature and then the excess bromine and carbon tetrachloride were removed in vacuo. The residue was heated at 50–60° C./2–4 mm. over a 2-hour period, leaving 332.7 grams of an amber sirup; $n_D^{25}$ 1.5666. Analysis of the product gave the following results:
Calculated for $C_9H_{15}BBr_6O_3$: C=16.34%, H=2.29%, Br=72.48%. Found: C=16.30%, H=2.33%, Br=71.75%.

EXAMPLE II

*Bis(2,3-dibromopropyl)-2,6-di-tert.-butylphenyl borate*

To a stirred solution of 49.5 grams (0.15 mole) of diallyl-2,6-di-tert.-butylphenyl borate in 100 ml. of carbon tetrachloride was slowly added 57 grams (0.357 mole) of bromine while maintaining the solution at a temperature of 6°–14° C. The excess bromine and solvent were removed in vacuo at room temperature and the residue was heated for 2.5 hours at 60°–85° C. at about 1 mm. to give 97.8 grams of a very viscous, light yellow sirup; $n_D^{25}$ 1.5407.

Analysis of the product gave the following results:
Calculated for $C_{20}H_{31}BBr_4O_3$: C=36.96%, H=4.81%, Br=49.18%. Found: C=37.34%, H=5.09%, Br=50.19%.

EXAMPLE III

*2-(2,3-dibromopropoxy)-4,4,6-trimethyl-1,3-dioxa-2 borinane*

To a stirred solution of 46.0 grams (0.25 mole) of 2-allyloxy-4,4,6-trimethyl-1,3-dioxa-2-borinane in 100 ml. of carbon tetrachloride cooled in an ice bath was added 41.6 grams (0.26 mole) of bromine at 10°–15° C. over a 1.25-hour period. Removal of excess bromine and solvent at 80°–85° C./0.3 mm. left 83.6 grams of the product as a yellow, viscous liquid; $n_D^{25}$ 1.4918.

Analysis of the product gave the following result:

Calculated for $C_9H_{17}Br_2BO_3$: C=31.41%, H=5.65%, Br=46.49%. Found: C=31.14%, H=5.48%, Br=46.26%.

The intermediate diallyl phenyl borates can be prepared by the reaction of triallyl borate with the phenol as illustrated by the following example:

EXAMPLE IV

Diallyl 2,6-di-tert.-butylphenyl borate

A one-liter reaction vessel equipped with a one-foot packed column with stillhead and receiver was charged with two moles (412.6 g.) of 2,6-di-tert.-butylphenol (100% excess) and one mole (182 g.) of triallyl borate. Heat was applied and 41.8 grams of allyl alcohol was removed as distillate (theory 58.1 g.) in 4.5 hours. The head temperature was held at about 97° C., the boiling point of allyl alcohol. The heat was then removed and the packed column replaced by a one-foot Vigreux column. The unreacted triallyl borate distilled at 79–82° C./18 mm. and the excess phenol distilled at 87–93° C./0.5 mm. The product, 2,6-di-tert.-butylphenyl diallyl borate, was then distilled at 104 to 110° C./0.2 mm. The yield of ester, which is a colorless liquid, was 152 g. (46% yield based on triallyl borate). Analysis for boron by Parr bomb fusion gave 3.20% boron (theoretical value 3.28%).

The intermediate 2-allyloxy alkylene glycol borates can be prepared by the reaction of triallyl borate with a tris alkylene glycol biborate as illustrated by the following example:

EXAMPLE V

2-allyloxy-4,4,6-trimethyl-1,3-dioxa-2-borinane

A mixture of 91.0 grams (0.5 mole) of triallyl borate and 185.1 grams (0.5 mole) of tris(2-methyl-2,4-pentanediol)-biborate was heated and the reaction mixture distilled under reduced pressure through a short Vigreux column. The desired product (238 grams; 86% yield) was collected at 81–84° C./5.5–5.9 mm.; $n_D^{25}$ 1.4278. Analysis for boron by hydroylsis gave 5.94% boron (theoretical, 5.88%).

The 2,3-dibromopropyl borate compounds can be incorporated into the polyurethane by any of several procedures, but it is preferred to and them to a precursor of the polymer. For example, the borate can be added to a mixture of polyurethane prepolymer prior to the final polymerization reaction and/or foaming. Alternatively, the borate can be added to any of the reactants, such as the diisocyanate or hydroxyl-containing polyester or polyether, prior to the polymer-forming reaction. A minor amount of the borate will reduce the flammability of the polyurethane. Thus, about 0.1 to 30 percent is effective, with a preferred concentration in the range of about 5 to about 20 percent.

The polyurethanes or precursors thereof can be formed by any of the reactions well known to the art. For example, polyisocyanates such as the tolylene diisocyanates, 3,3'-bitolyene - 4,4' - diisocyanate, diphenylmethane-4,4-diisocyanate, 3,3'-dimethyldiphenylmethane - 4,4' - diisocyanate, meta-phenylene diisocyanate, triphenylmethane triisocyanate, hexamethylene diisocyanate, dianisidine diisocyanate, polymethylene polyphenylisocyanate and naphthalene 1,5-diisocyanate, can be reacted with compounds having two or more reactive hydrogens.

Of the compounds having groups containing reactive hydrogens, there can be used the hydroxyl terminated polyesters, hydroxyl terminated polyethers and polythioethers, the polyglycols, such as tris(hydroxypropyl)glycerol, the polyhydroxypropylated sucrose derivatives, hydroxyl terminated copolymers of carbon monoxide and an alkylene oxide, and the like.

The 2,3-dibromopropyl borate additives will either reduce the burning rate of the polyurethane or are self-extinguishing as illustrated by the following examples. All parts by weight.

EXAMPLE VI

Polyurethane foams containing various 2,3-dibromopropyl borate compounds were prepared in 1 pint paper cups. Polymethylene polyphenylisocyanate (having an equivalent weight per isocyanate group of 130.6 and an acid factor of 237) (23.3 parts), 18.3 parts of Niax Hexol LS–490 (a hydroxypropyl sorbitol), 0.6 part of triethylenediamine-1,2,6-hexanetriol mixture (1:2 by weight), 0.6 part of N,N,N',N'-tetramethyl-1,3-butanediamine, 0.1 part of DC–113 Silicone (a silicone-glycol copolymer), 10 parts of trichlorofluoromethane and the indicated amount of borate additive were weighed directly into the cup and the mixture stirred rapidly with a high-speed disc stirrer. After the foam had become rigid, a sample was prepared and the burning rate determined as described in ASTM D–635–56T test procedure. The results were recorded as in Table A. The amount of additive is expressed as parts per hundred of resin.

TABLE A

| Additive | Amount of Additive | Burn Rate (in./min.) |
|---|---|---|
| Tris(2,3-dibromopropyl)borate | 12.1 | (²) |
| Bis(2,3-dibromopropyl)-2,6-di-tert.-butylphenyl borate | 11.8 | 11.4 |
| 2-(2,3-dibromopropoxy)-4,4,6-trimethyl-1,3-dioxa-2-borinane ¹ | 9.9 | 11.2 |
| Control (none) | | 20.7 |

¹ Half as much N,N,N',N'-tetramethyl-1,3-butanediamine catalyst used.
² Self-extinguishing 5–10 sec.

EXAMPLE VII

The test was repeated with a tolylene diisocyanate-hydroxypropyl sucrose prepolymer, to which had been added 8.8 parts of the additive. Substantially the same results were obtained with tris(2,3-dibromopropyl)borate, bis(2,3-dibromopropyl)-2,6-di-tert.-butylphenyl borate or 2-(2,3-dibromopropoxy)-4,4,6-trimethyl-1,3-dioxa-2-borinane as the additive.

Other modes of applying the principle of the invention may be employed, change being made as regards the details described, provided the features stated in any of the following claims or the equivalent of such be employed.

We, therefore, particularly point out and distinctly claim as our invention:

1. Bis(2,3-dibromopropyl)-2,6-di-tert.-butylphenyl borate.

2. 2-(2,3-dibromopropoxy)-4,4,6-trimethyl - 1,3-dioxa-2-borinane.

No references cited.

CHARLES B. PARKER, *Primary Examiner.*

DELBERT R. PHILLIPS, *Assistant Examiner.*